US011671140B2

(12) United States Patent
Kilian et al.

(10) Patent No.: US 11,671,140 B2
(45) Date of Patent: *Jun. 6, 2023

(54) OPTIMIZED COMBINATION OF PREAMBLE AND DATA FIELDS FOR SENSOR NETWORKS HAVING LOW ELECTRICITY CONSUMPTION ON THE BASIS OF THE TELEGRAM SPLITTING METHOD

(71) Applicant: Fraunhofer-Gesellschaft zur Foerderung der angewandten Forschung e.V., Munich (DE)

(72) Inventors: Gerd Kilian, Erlangen (DE); Josef Bernhard, Erlangen (DE); Stefan Ereth, Erlangen (DE); Jakob Kneissl, Erlangen (DE); Johannes Wechsler, Erlangen (DE)

(73) Assignee: Fraunhofer Gesellschaft Zur Foerderung der Angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,798

(22) Filed: Apr. 24, 2019

(65) Prior Publication Data

US 2019/0253101 A1 Aug. 15, 2019

Related U.S. Application Data

(63) Continuation of application No. PCT/EP2017/077029, filed on Oct. 23, 2017.

(30) Foreign Application Priority Data

Oct. 24, 2016 (DE) ..................... 10 2016 220 883.7

(51) Int. Cl.
*H04B 1/713* (2011.01)
*H04L 5/00* (2006.01)
(Continued)

(52) U.S. Cl.
CPC ........... *H04B 1/713* (2013.01); *H04L 5/0012* (2013.01); *H04L 5/0048* (2013.01);
(Continued)

(58) Field of Classification Search
CPC ........... H04B 1/713; H04B 2001/6908; H04L 5/0012; H04L 5/0048; H04L 67/12; H04L 7/0008
(Continued)

(56) References Cited

U.S. PATENT DOCUMENTS 5,020,056 A 5/1991 Chennakeshu
5,852,630 A * 12/1998 Langberg ............ H04L 27/2647
375/219

(Continued)

FOREIGN PATENT DOCUMENTS

CN 101626584 A 1/2010
CN 102474800 A 5/2012
(Continued)

OTHER PUBLICATIONS

Kilian, Gerd et al., "Improved Coverage for Low-Power Telemetry Systems using Telegram Splitting", Proceedings of 2013 European Conference on Smart Objects, Systems, and Technologies (SmartSysTech), Jun. 11, 2013.
(Continued)

*Primary Examiner* — Siu M Lee
(74) *Attorney, Agent, or Firm* — Perkins Coie LLP; Michael A. Glenn

(57) ABSTRACT

Embodiments provide a transmission method for wireless transmission of data within a communication system. The method includes a step of transmitting the data in a manner that is time-synchronized with a reference signal while using a frequency hopping pattern and/or time hopping pattern.

16 Claims, 8 Drawing Sheets

(51) Int. Cl.
*H04L 7/00* (2006.01)
*H04L 67/12* (2022.01)
*H04B 1/69* (2011.01)

(52) U.S. Cl.
CPC ............ *H04L 7/0008* (2013.01); *H04L 67/12* (2013.01); *H04B 2001/6908* (2013.01)

(58) Field of Classification Search
USPC ....... 375/132, 133, 135, 136, 138, 140, 141, 375/146, 147
See application file for complete search history.

(56) References Cited

U.S. PATENT DOCUMENTS

| | | | |
|---|---|---|---|
| 6,005,884 A * | 12/1999 | Cook | H04W 88/085 |
| | | | 370/338 |
| 6,130,885 A | 10/2000 | Izumi et al. | |
| 8,077,593 B2 | 12/2011 | Iwai et al. | |
| 8,175,134 B1 | 5/2012 | Giallorenzi et al. | |
| 8,358,613 B1 | 1/2013 | Giallorenzi et al. | |
| 10,348,477 B2 | 7/2019 | You et al. | |
| 2002/0013135 A1 | 1/2002 | Proctor | |
| 2003/0140298 A1 | 7/2003 | Koprivica | |
| 2004/0082353 A1 | 4/2004 | Kekki | |
| 2004/0109419 A1 | 6/2004 | Sano et al. | |
| 2005/0176371 A1 | 8/2005 | Palin et al. | |
| 2006/0104333 A1* | 5/2006 | Rainbolt | H04W 76/14 |
| | | | 375/132 |
| 2006/0285579 A1* | 12/2006 | Rhee | H04W 52/0216 |
| | | | 375/132 |
| 2007/0133462 A1 | 6/2007 | Guey | |
| 2008/0043813 A1* | 2/2008 | Azenkot | H04B 1/7143 |
| | | | 375/133 |
| 2008/0117954 A1 | 5/2008 | Chuang et al. | |
| 2009/0116599 A1 | 5/2009 | McCoy | |
| 2010/0002750 A1 | 1/2010 | Hardacker et al. | |
| 2010/0110929 A1 | 5/2010 | Li et al. | |
| 2010/0238787 A1 | 9/2010 | Guey | |
| 2010/0309953 A1 | 12/2010 | Park et al. | |
| 2011/0013531 A1 | 1/2011 | Liu | |
| 2011/0038398 A1 | 2/2011 | Konno et al. | |
| 2011/0255433 A1 | 10/2011 | Roh et al. | |
| 2012/0002613 A1 | 1/2012 | Kishiyama et al. | |
| 2013/0170467 A1 | 7/2013 | Ogawa et al. | |
| 2013/0230060 A1 | 9/2013 | Bernhard et al. | |
| 2013/0301681 A1 | 11/2013 | Hassan et al. | |
| 2014/0176341 A1* | 6/2014 | Bernhard | H04W 72/04 |
| | | | 340/870.02 |
| 2014/0192756 A1 | 7/2014 | Baldemair et al. | |
| 2014/0192789 A1 | 7/2014 | Bernhard et al. | |
| 2014/0269842 A1* | 9/2014 | Lacatus | H04B 1/7156 |
| | | | 375/134 |
| 2014/0286455 A1 | 9/2014 | Choi et al. | |
| 2015/0009894 A1* | 1/2015 | Vermani | H04L 1/0072 |
| | | | 370/328 |
| 2015/0016426 A1* | 1/2015 | Merlin | H04W 72/0466 |
| | | | 370/335 |
| 2015/0029962 A1 | 1/2015 | Yun et al. | |
| 2015/0180534 A1 | 6/2015 | Lacatus et al. | |
| 2015/0282068 A1* | 10/2015 | Rajagopal | H04L 5/0048 |
| | | | 370/350 |
| 2016/0044729 A1 | 2/2016 | Tu et al. | |
| 2016/0057798 A1 | 2/2016 | Chae et al. | |
| 2016/0094269 A1 | 3/2016 | Seller | |
| 2016/0211883 A9 | 7/2016 | Dahlman et al. | |
| 2016/0235301 A1* | 8/2016 | Melodia | G08C 23/02 |
| 2016/0366649 A1 | 12/2016 | Bernhard et al. | |
| 2018/0152264 A1 | 5/2018 | Kilian et al. | |
| 2018/0183491 A1 | 6/2018 | Takeda et al. | |
| 2019/0253102 A1* | 8/2019 | Kilian | H04B 1/7143 |

FOREIGN PATENT DOCUMENTS

| | | |
|---|---|---|
| CN | 103701490 A | 4/2014 |
| CN | 104285383 A | 1/2015 |
| CN | 105009469 A | 10/2015 |
| CN | 105359597 A | 2/2016 |
| DE | 102010043151 A1 | 5/2012 |
| DE | 102011082098 B4 | 3/2013 |
| DE | 102011082100 A1 | 3/2013 |
| EP | 2151928 A1 | 2/2010 |
| EP | 2487503 A1 | 8/2012 |
| EP | 2763321 A1 | 8/2014 |
| EP | 2914039 A1 | 9/2015 |
| EP | 3125453 A1 | 2/2017 |
| JP | H08181637 A | 7/1996 |
| JP | H11284547 A | 10/1999 |
| JP | 2003218743 A | 7/2003 |
| JP | 2011188316 A | 9/2011 |
| JP | 2012507974 A | 3/2012 |
| JP | 2016519463 A | 6/2016 |
| RU | 2418370 C2 | 5/2011 |
| RU | 2479929 C2 | 4/2013 |
| WO | 2005022799 A1 | 3/2005 |
| WO | 2007089797 A2 | 8/2007 |
| WO | 2007/140088 A2 | 12/2007 |
| WO | 2009/064647 A1 | 5/2009 |
| WO | 2009/115563 A1 | 9/2009 |
| WO | 2009139724 A1 | 11/2009 |
| WO | 2010/079953 A2 | 7/2010 |
| WO | 2012109542 A1 | 8/2012 |
| WO | 2014179474 A1 | 11/2014 |
| WO | 2015128385 A1 | 9/2015 |
| WO | 2016064315 A1 | 4/2016 |

OTHER PUBLICATIONS

Kilian, Gerd et al., "Increasing Transmission Reliability for Telemetry Systems Using Telegram Splitting", IEEE Transactions on Communications, vol. 63, No. 3, pp. 949-961, Mar. 2015, Mar. 2015, pp. 949-961.

Dolinar, Sam , et al., "Turbo Code Performance as a Function of Code Block Size", 1998 IEEE International Symposium on Information Theory.

Lam, Alex W., et al., "Time-Hopping and Frequency-Hopping Multiple-Access Packet Communications", IEEE Transactions on Communications, IEEE Service Center, Piscataway, NJ. USA, Band 38, Nr. 6, Jun. 1, 1990 (Jun. 1, 1990), Seite 875-888, XP002671768, Jun. 1, 1990.

Samsung , "Time-frequency hopping design for Mode 2 resource allocation", 3rd Generation Partnership Project (3GPP), Mobile Competence Centre; 650, Route Des Lucioles, Aug. 17, 2014.

* cited by examiner

OPTIMIZED COMBINATION OF PREAMBLE AND DATA FIELDS FOR SENSOR NETWORKS HAVING LOW ELECTRICITY CONSUMPTION ON THE BASIS OF THE TELEGRAM SPLITTING METHOD

CROSS-REFERENCES TO RELATED APPLICATIONS

This application is a continuation of copending International Application No. PCT/EP2017/077029, filed Oct. 23, 2017, which is incorporated herein by reference in its entirety, and additionally claims priority from German Application No. DE 10 2016 220 883.7, filed Oct. 24, 2016, which is incorporated herein by reference in its entirety.

Embodiments of the present invention relate to a data transmitter for transmitting data. Further embodiments relate to a data receiver for receiving data. Some embodiments relate to an optimized combination of preamble and data fields for sensor networks with little electricity consumption on the basis of the telegram splitting method.

BACKGROUND OF THE INVENTION

DE100 2011 082 098 B4 describes a method for battery-operated transmitters wherein the data packet is subdivided into transmit packets which are smaller than the actual information to be transmitted (so-called telegram splitting). Telegrams are split up into several subpackets. Such a subpacket is referred to as a hop. Several information symbols are transmitted in one hop. The hops are sent at one frequency or distributed across several frequencies, so-called frequency hopping. Between the hops, there are breaks during which no transmission takes place.

In a typical sensor network, several 100,000 sensor nodes are covered by only one base station. Since the sensor nodes have only very small batteries, coordination of the transmissions is hardly possible in most cases. By means of the telegram splitting method, very high transmission reliability is achieved for this purpose.

WO 2015/128385 A1 describes a data transmit arrangement comprising an energy harvesting element as its energy source. The data transmit arrangement is configured to send data while using the telegram splitting method, wherein a subpacket about to be sent is either sent, buffered and sent later, or discarded as a function of an amount of electrical energy that may be provided by the energy supply means.

The publication [G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013.] describes improved coverage for low-energy telemetry systems using the telegram splitting method.

The publication [G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015.] describes improved transmission reliability for low-energy telemetry systems using the telegram splitting method.

US 2016/0094269 A1 describes a wireless communication system comprising a plurality of base stations and a plurality of end points. The communication system uses telegrams with a CSS-modulated (CSS=chirp spread spectrum) preamble followed by data, the data being modulated at a smaller bandwidth than the preamble.

SUMMARY

An embodiment has a data transmitter configured to send data in a manner that is time-synchronized with a reference signal while using a frequency hopping pattern and/or time hopping pattern; wherein the reference signal is a preamble, wherein the preamble is transmitted en bloc at one frequency.

Another embodiment has a data receiver configured to receive data, or extract it from a buffer, while using a frequency hopping pattern and/or time hopping pattern in a manner that is time-synchronized with a reference signal; wherein the reference signal is a preamble, wherein the preamble is transmitted en bloc at one frequency.

According to another embodiment, a system may have: an inventive data transmitter; and an inventive data receiver.

According to another embodiment, a method of transmitting data may have the steps of: transmitting data while using a frequency hopping pattern and/or time hopping pattern in a manner that is time-synchronized with a reference signal; wherein the reference signal is a preamble, wherein the preamble is transmitted en bloc at one frequency.

According to another embodiment, a method of receiving data may have the steps of: receiving data while using a frequency hopping pattern and/or time hopping pattern in a manner that is time-synchronized with a reference signal; wherein the reference signal is a preamble, wherein the preamble is transmitted en bloc at one frequency.

According to another embodiment, a non-transitory digital storage medium may have: a computer program stored thereon to perform the inventive methods, when said computer program is run by a computer.

Another embodiment may have a sensor node configured to send data and a preamble, the sensor node being configured to send out the data with a transmission method different than that used for the preamble, the sensor node being configured to send the data in a manner that is time-synchronized with the reference signal while using a frequency hopping pattern and/or time hopping pattern; the sensor node being configured to send the preamble en bloc without using a frequency hopping pattern.

Embodiments provide a data transmitter configured to send out data in a manner that is time-synchronized with a reference signal while using a frequency hopping pattern and/or time hopping pattern.

Embodiments provide a data receiver configured to receive data, or to extract data from a buffer, in a manner that is time-synchronized with a reference signal while using a frequency hopping pattern and/or time hopping pattern.

The present invention is based on the idea of sending data in a manner that is time-synchronized with a reference signal while using a frequency hopping pattern and/or time hopping pattern. By using the frequency hopping pattern and/or time hopping pattern, transmission reliability may be increased since the probability that all of the transmission frequencies and/or all of the transmission times predefined by the frequency hopping pattern and/or time hopping pattern will be interfered with by an interferer is smaller than the probability that only one transmission frequency and/or only one transmission time will be interfered with by the interferer. In addition, a computing power involved in detecting the data on the part of the data receiver may be reduced since the data is sent out in a manner that is time-synchronized with the reference signal, which may be either sent out itself by the data transmitter or is easy to detect.

Further embodiments provide a method of transmitting data. The method includes a step of sending data in a manner that is time-synchronized with a reference signal while using a frequency hopping pattern and/or time hopping pattern.

Further embodiments provide a method of receiving data. The method includes a step of receiving data in a manner that is time-synchronized with a reference signal while using a frequency hopping pattern and/or time hopping pattern.

Further embodiments provide a transmission method for wireless transmission of data within a communication system (e.g. a sensor network or telemetry system). The method includes a step of transmitting the data in a manner that is time-synchronized with a reference signal while using a frequency hopping pattern and/or time hopping pattern.

Advantageous embodiments of the data transmitter will be described below.

In embodiments, the data transmitter may be configured to send out the data in a manner that is time-synchronized and/or frequency-synchronized with the reference signal while using the frequency hopping pattern and/or time hopping pattern.

For example, the data transmitter may be configured to temporally adapt a transmission time or transmission times for transmitting the data to a time of the reference signal, so that the reference signal and transmission of the data will be time-synchronized.

In addition, the data transmitter may be configured to adapt a transmission frequency and/or transmission frequencies for sending the data to a frequency of the reference signal, so that the reference signal and transmission of the data will be frequency-synchronized.

In embodiments, the frequency hopping pattern may indicate a sequence of transmission frequencies or transmission frequency hops by means of which the data is to be sent.

For example, a first portion of the data may be sent at a first transmission frequency (or within a first frequency channel), and a second portion of the data may be sent at a second transmission frequency (or within a second frequency channel), the first transmission frequency and the second transmission frequency being different. In this context, the frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Of course, the frequency hopping pattern may indicate only the frequency interval (transmission frequency hop) between the first transmission frequency and the second transmission frequency.

In embodiments, the time hopping pattern may indicate a sequence of transmission times or transmission time intervals at which the data is to be sent.

For example, a first portion of the data may be sent at a first transmission time (or within a first transmission time slot), and a second portion of the data may be sent at a second transmission time (or within a second transmission time slot), the first transmission time and the second transmission time being different. The time hopping pattern may define (or specify or indicate) the first transmission time and the second transmission time. Alternatively, the time hopping pattern may indicate the first transmission time and a time interval between the first transmission time and the second transmission time. Of course, the time hopping pattern may indicate only the time interval between the first time and the second transmission time.

In embodiments, the data transmitter may be configured to send the data along with at least one synchronization sequence while using the frequency hopping pattern and/or time hopping pattern.

In embodiments, the data may include at least two data packets, the data transmitter being configured to send out the at least two data packets in accordance with the frequency hopping pattern and/or time hopping pattern.

For example, the at least two data packets may each contain a different or overlapping portion of the data so that the data will not be transmitted en bloc but in manner in which it is split up into the data packets The data may be a telegram, the data transmitter being configured to split up the telegram into the at least two data packets, each of the at least two data packets being shorter than the telegram.

The data transmitter may be configured to provide at least a portion of the data packets with synchronization sequences or partial synchronization sequences. A portion of the data packets may therefore contain data only. A portion of the data packets may contain both data and a synchronization sequence or partial synchronization sequence. A portion of the data packets may contain only a synchronization sequence or a partial synchronization sequence.

In embodiments, the data transmitter may be configured to send out the reference signal itself, the reference signal being a preamble. The data transmitter may be configured to send out the preamble such that same will be suitable for complete detection on the receiver side.

For example, the data transmitter may be configured to send out the preamble in such a manner that same may be detected by itself in a data receiver. When the correct time of the preamble is detected on the receiver side, the data may be decoded without any further detection.

In embodiments, the data transmitter may be configured to send out the preamble en bloc, i. e. without any interruption or transmission pause. The data transmitter may be configured to send out the preamble before the data, after the data or in between the data in such a manner that transmission of the preamble is not superimposed by transmission of the data.

For example, the data transmitter may be configured to send out the data and the preamble at different transmission times and/or at different transmission frequencies, so that transmission of the preamble is not superimposed by transmission of the data.

The data transmitter may be configured to send out the preamble at a data rate lower than that used for the data. In this manner it is possible to detect the preamble on the receiver side even with a low signal/noise ratio.

The data transmitter may be configured to send out the preamble with a modulation type or a modulation method different than that used for the data.

For example, the data transmitter may be configured to send out the preamble in a BPSK-modulated (BPSK=binary phase-shift keying), in an OFDM-modulated (OFDM=orthogonal frequency-division multiplexing) or in a CSS-modulated (CSS=chirp spread spectrum) manner and to send out the data in a UNB-modulated (UNB=ultra narrow-band) manner.

The data transmitter 100 may be configured to send out the data while using the telegram splitting method. In this context, the data may be a telegram, the data transmitter being configured to split up the telegram into a plurality of data packets (or data sub-packets or partial data packets), each of the plurality of data packets being shorter than the telegram. The plurality of data packets may be sent out while using the frequency hopping pattern and/or time hopping pattern. For example, each of the plurality of data packets has a transmission frequency (or a transmission frequency hop related to a previous data packet) and/or a transmission time (or transmission time interval, or transmission time slot, transmission time hop related to a previous data packet) associated with it due to the frequency hopping pattern and/or time hopping pattern. In addition, the plurality of data packets may be sent out at a time interval, so that there will be transmission pauses in between the data packets.

The data transmitter may be configured to transmit further data along with the preamble en bloc. The further data may be appended to or placed in front of the preamble. Of course, it is also possible for a portion of the preamble to be transmitted before the further data, and for another portion of the preamble to be transmitted after the further data.

At least a portion of the further data transmitted with the preamble may contain information regarding the frequency hopping pattern and/or time hopping pattern by means of which the data is transmitted.

In embodiments, the reference signal may include at least two preambles.

The data transmitter may be configured to send out the at least two preambles with different modulation types or modulation methods. In addition, the data transmitter may be configured to send out the at least two preambles at different data rates. Moreover, the data transmitter may be configured to send out the at least two preambles at different transmission frequencies.

The data transmitter may be configured to send out at least two preambles such that each of at least two preambles is suited for complete detection on the receiver side.

For example, the data transmitter may be configured to send out the at least two preambles such that each preamble is detectable by itself on the receiver side, so that only one preamble continues to be useful for determining the correct reference time. The two preambles may be sent at different frequencies.

For example, the data transmitter may be configured to send out the same preamble several times (at least twice).

The data transmitter may be configured to send out the at least two preambles such that a first preamble of the at least two preambles is suited only for coarse detection on the receiver side and that a second preamble of the at least two preambles is suited for complete detection on the receiver side.

For example, the data transmitter may be configured to send out the first preamble such that the first preamble may be easily detected, on the receiver side, in a reception data stream. On the receiver side, detection of the first preamble provides only poor temporal accuracy which, however, is sufficient for locating the second preamble in the reception data stream, on the basis of which actual detection or synchronization will then be performed.

The data transmitter may further be configured to send out further data along with a first preamble of the at least two preambles en bloc; the further data sent out together with the first preamble en bloc may contain information regarding a second preamble of the at least two preambles. With the information contained within the further data, for example a time interval or frequency interval between the at least two preambles may be signaled.

The data transmitter may further be configured to split up one of the at least two preambles into at least two partial preambles and to send out the at least two partial preambles at a time and/or frequency interval in relation to each other.

In embodiments, the data transmitter may be configured to send out the reference signal itself, the reference signal being a signal (e.g. a beacon) which is repeated in a temporally deterministic manner.

For example, the data transmitter may be a base station sending out a beacon. At a known interval, the base station will then send out data to certain sensor nodes.

The data transmitter may be configured to send out the reference signal before the data, after the data or in between the data such that transmission of the reference signal will not be superimposed by transmission of the data.

The data transmitter may be configured to send out the reference signal at a data rate different from that used for the data. The data transmitter may be configured to send out the reference signal with a modulation type or a modulation method different than that used for sending the data.

The data transmitter may be configured to transmit further data along with the reference signal en bloc. At least a portion of the further data transmitted along with the reference signal en bloc may contain information regarding the frequency hopping pattern and/or time hopping pattern by means of which the data is transmitted.

In embodiments, the data transmitter may include a receiver configured to receive the reference signal from a different data transmitter. The reference signal may be a signal (e.g. a beacon) that is repeated in a temporally deterministic manner.

For example, the data transmitter may be a sensor node which receives the beacon of a base station and sends out, in response to receiving the beacon, the data to the beacon in a time-synchronized manner.

Advantageous embodiments of the data receiver will be described below.

In embodiments, the data receiver may be configured to receive the data, or to extract the data from the buffer, in a manner that is time- and frequency-synchronized with the reference signal while using the frequency hopping pattern and/or time hopping pattern.

For example, the data receiver may be configured to adapt a reception time or reception times for receiving the data to a time of the reference signal such that the reference signal and reception of the data will be time-synchronized.

In addition, the data receiver may be configured to adapt a reception frequency or reception frequencies for receiving the data to a frequency of the reference signal, so that the reference signal and reception of the data will be frequency-synchronized.

In embodiments, the frequency hopping pattern may indicate a sequence of reception frequencies or reception frequency hops at which the data is to be received.

For example, a first portion of the data may be received at a first reception frequency (or within a first frequency channel), and a second portion of the data may be received at a second reception frequency (or within a second frequency channel), the first reception frequency and the second reception frequency being different. The frequency hopping pattern may define (or specify or indicate) the first reception frequency and the second reception frequency. Alternatively, the frequency hopping pattern may indicate the first reception frequency and a frequency interval (reception frequency hop) between the first reception frequency and the second reception frequency. Of course, the frequency hopping pattern may indicate only the frequency interval (reception frequency hop) between the first reception frequency and the second reception frequency.

In embodiments, the time hopping pattern may indicate a sequence of reception times or reception time intervals at which the data is to be received.

For example, a first portion of the data may be received at a first reception time (or within a first reception time slot), and a second portion of the data may be received at a second reception time (or within a second reception time slot), the first reception time and the second reception time being different. The time hopping pattern may define (or specify or indicate) the first reception time and the second reception time. Alternatively, the time hopping pattern may indicate the first reception time and a time interval between the first reception time and the second reception time. Of course, the time hopping pattern may indicate only the time interval between the first reception time and the second reception time.

In embodiments, the data may include at least two data packets, wherein the data receiver may be configured to receive the at least two data packets, or extract them from the buffer, en bloc in accordance with the frequency hopping pattern and/or time hopping pattern.

The data may be a telegram split up into the at least two data packets, each of the at least two data packets being shorter than the telegram. The data receiver may be configured to combine the at least two data packets in order to obtain the telegram.

In embodiments, the reference signal may be a preamble.

The data receiver may be configured to receive the preamble, or to extract it from the buffer, in an en-bloc manner.

Moreover, the data receiver may be configured to receive the preamble, or extract it from the buffer, along with further data en bloc. The further data received or extracted from the buffer along with the preamble en bloc may contain information regarding the frequency hopping pattern and/or time hopping pattern, and the data receiver may be configured to receive the data, or extract the data from the buffer, while using the information regarding the frequency hopping pattern and/or time hopping pattern.

In embodiments, the reference signal may comprise two preambles.

A first preamble of the at least two preambles may be suitable for coarse detection, whereas a second preamble of the at least two preambles may be suited for complete detection. The data receiver may be configured to perform coarse detection while using the first preamble and to perform complete detection while using the second preamble.

The data receiver may be configured to receive further data, or extract it from the buffer, along with a first preamble of the at least two preambles. The further data may include information regarding a second preamble of the two preambles, and the data receiver may be configured to detect the second preamble while using the information regarding the second preamble in a reception data stream. For example, the information contained within the further data may be used to signal a time interval or frequency interval between the two preambles, and the data receiver may be configured to detect the second preamble while using the signaled time interval or frequency interval.

The two preambles may each be suitable for complete detection. The data receiver may be configured to immediately receive the data, in the event of successful complete detection of one of the two preambles, without performing detection of a further one of the two preambles. In addition, the data receiver may be configured to perform, in the event of unsuccessful complete detection of one of the two preambles, detection of the further one of the two preambles. Furthermore, the data receiver may be configured, in the event of unsuccessful complete detection of the two preambles, to combine the two preambles so as to perform detection.

In embodiments, the data receiver may be configured to send out the reference signal itself. The reference signal may be a signal (e.g. a beacon) which is repeated in a temporally deterministic manner.

For example, the data receiver may be a base station configured to send out a beacon and to receive data sent out from a sensor node, in response to the beacon, in a manner that is time-synchronized with the beacon.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
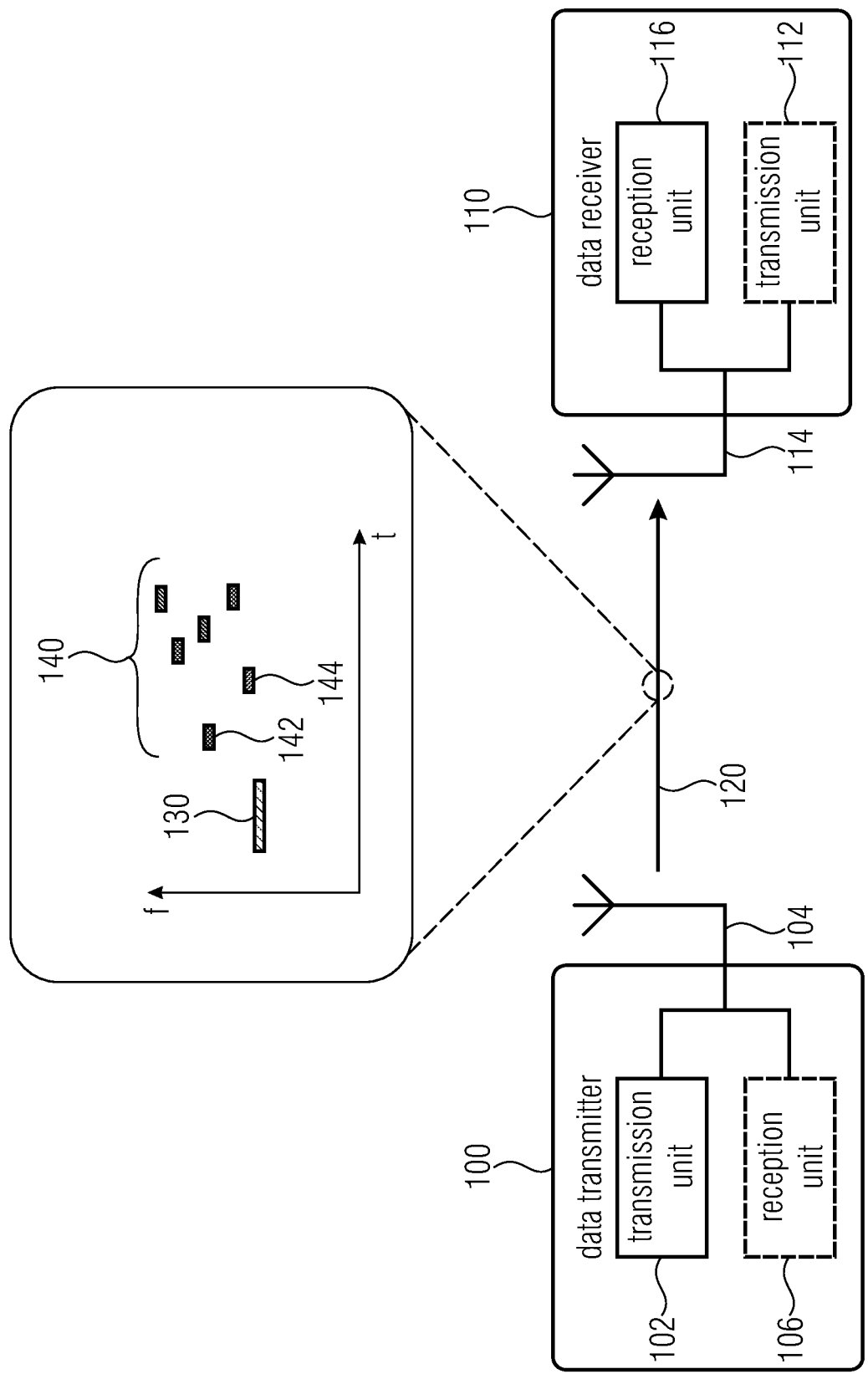
FIG. 1 shows a schematic block diagram of a system comprising a data transmitter and a data receiver, in accordance with an embodiment of the present invention.

In the following description of the embodiments of the present invention, elements which are identical or identical in action will be referred to by identical reference numerals in the figures so that their respective descriptions in the different embodiments are interchangeable.

FIG. 1 shows a schematic block diagram of a system comprising a data transmitter 100 and a data receiver 110, in accordance with an embodiment of the present invention. The system uses a frequency hopping pattern and/or time hopping pattern for transmitting data 120 from the data transmitter 100 to the data receiver 110.

In embodiments, the data transmitter 100 is configured to send out the data 120 in a manner that is time-synchronized with a reference signal 130 while using the frequency hopping pattern and/or time hopping pattern.

In embodiments, the data receiver 110 is configured to receive the data 120 in a manner that is time-synchronized with the reference signal 130 while using the frequency hopping pattern and/or time hopping pattern.

In FIG. 1, one assumes, by way of example, that the data is transmitted while using a frequency and time hopping pattern (i.e. a combination of a frequency hopping pattern and a time hopping pattern) 140. Of course, the data 120 may be transmitted only while using a frequency hopping pattern or a time hopping pattern.

A frequency hopping pattern may be a sequence of transmission frequencies or transmission frequency hops by means of which the data transmitter 100 sends the data.

For example, a first portion of the data may be sent at a first transmission frequency (or within a first frequency channel), and a second portion of the data may be sent at a second transmission frequency (or within a second frequency channel), the first transmission frequency and the second transmission frequency being different. In this context, the frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Of course, the frequency hopping pattern may indicate only the frequency interval (transmission frequency hop) between the first transmission frequency and the second transmission frequency.

A time hopping pattern may indicate a sequence of transmission times or transmission time intervals at which the data transmitter 100 sends the data.

For example, a first portion of the data may be sent at a first transmission time (or within a first transmission time slot), and a second portion of the data may be sent at a second transmission time (or within a second transmission time slot), the first transmission time and the second transmission time being different. The time hopping pattern may define (or specify or indicate) the first transmission time and the second transmission time. Alternatively, the time hopping pattern may indicate the first transmission time and a time interval between the first transmission time and the second transmission time. Of course, the time hopping pattern may indicate only the time interval between the first time and the second transmission time.

As was already mentioned, the data transmitter 100 is configured to send out the data in a manner that is time-synchronized with the reference signal while using the frequency hopping pattern and/or time hopping pattern.

Therefore, the data transmitter 100 may be configured to temporally adapt transmission of the data to the reference signal while using the frequency hopping pattern and/or time hopping pattern.

For example, the data transmitter 100 may be configured to temporally adapt a transmission time or transmission times for transmitting the data to a time of the reference signal, so that the reference signal and transmission of the data will be time-synchronized.

For example, the data transmitter 100 may be configured to adapt a transmission time (e.g. a transmission time with a frequency hopping pattern only or the transmission times (e.g. a first transmission time and a second transmission time) with a time hopping pattern only or a combined frequency and time hopping pattern) to a transmission time or reception time of the reference signal, so that a fixedly defined time relationship (e.g. time interval or time intervals) is maintained between the transmission time or reception time of the reference signal and the transmission time(s) of the data.

The data transmitter 100 may further be configured to send out the data in a manner that is frequency-synchronized with the reference signal while using the frequency hopping pattern and/or time hopping pattern.

For example, the data transmitter 100 may be configured to adapt a transmission frequency or transmission frequencies for transmitting the data to a frequency of the reference signal, so that the reference signal and transmission of the data will be frequency-synchronized.

For example, the data transmitter 100 may be configured to adapt a transmission frequency (e.g. a transmission frequency with a time hopping pattern only or the transmission frequencies (e.g. a first transmission frequency and a second transmission frequency) with a frequency hopping pattern only or a combined frequency and time hopping pattern) to a transmission frequency or reception frequency of the reference signal, so that a fixedly defined frequency relationship (e.g. identical frequency or frequency interval(s)) is maintained between the transmission frequency or reception frequency of the reference signal and the transmission frequency or frequencies of the data.

A time and frequency hopping pattern 140 may be the combination of a frequency hopping pattern and a time hopping pattern, i.e. a sequence of transmission times or transmission time intervals by means of which the data transmitter 100 transmits the data, the transmission times (or transmission time intervals) having transmission frequencies (or transmission frequency hops) associated therewith.

In embodiments, the data may include at least two data packets 142 and 144 which are transmitted from the data transmitter 100 to the data receiver 110 in accordance with the frequency hopping pattern and/or time hopping pattern.

The data may be transmitted such that transmission pauses (pauses during which the data transmitter is not transmitting) exist between the at least two data packets 142 and 144.

The data may be a telegram split up into at least two data packets 142 and 144, each of the at least two data packets 142 and 144 being shorter than the telegram.

In embodiments, the data transmitter 100 may comprise a transmission unit 102 configured to send the data 120. The transmission unit 102 may be connected to an antenna 104 of the data transmitter 100. The data transmitter 100 may further comprise a reception unit 106 configured to receive data. The reception unit may be connected to the antenna 104 or to a further (separate) antenna of the data transmitter 100. The data transmitter 100 may also comprise a combined transmission/reception unit (transceiver).

The data receiver 110 may comprise a reception unit 116 configured to receive the data 120. The reception unit 116 may be connected to an antenna 114 of the data receiver 110. Moreover, the data receiver 110 may comprise a transmission unit 112 configured to transmit data. The transmission unit 112 may also be connected to the antenna 114 or to a further (separate) antenna of the data receiver 110.

In embodiments, the data transmitter 100 may be a sensor node, whereas the data receiver 110 may be a base station. Of course, it is also possible for the data transmitter 100 to be a base station, while the data receiver 110 is a sensor node. In addition, it is also possible for both the data transmitter 100 and the data receiver 110 to be sensor nodes. In addition, it is possible for both the data transmitter 100 and the data receiver 110 to be base stations.

Detailed embodiments of the transmission method which is presented by means of FIG. 1 and may be performed by the data transmitter 100 and the data receiver 110 will be explained in more detail below.

In this context, techniques are shown which enable extending already existing standard receivers by the telegram splitting method. In this manner, improved immunity to interference, improved throughput and, as a rule, also improved energy consumption may be achieved at the data receiver (e.g. sensor node) 110.

In a typical receiver 110, synchronization and detection of the telegrams represent the largest challenge in most cases and involve the most computing power. If detection is also performed by using the telegram splitting method, this will typically increase energy consumption even more.

To avoid this while obtaining high immunity to interference, which is achieved by means of the telegram splitting method, embodiments involve using a combination of a (classic) preamble and the telegram splitting method.

In this context, detection of the receiver typically is not adapted, and, thus, all previously existing algorithms may continue to be used. The comparatively simple decoder may be extended by telegram splitting.

Detection of the telegrams is conventionally also performed, with the telegram splitting method, with the aid of the splitted hops (data packets or subdata packets). Since the transferred energy of a single transmitted hop typically is not sufficient for detection, the preamble may be split up over several hops. In the receiver, they may be re-joined with a very large amount of computing expenditure in order to be able to perform detection.

First Detailed Embodiment

To avoid this problem, one or more preambles may not be transmitted in a split manner but en bloc. Thus, classic methods may be employed for detection which involve much less computing power than the splitted preambles. Subsequently, the data may be transmitted by means of telegram splitting in order to ensure immunity to interference, as shown in FIG. 2.

Figure 2:
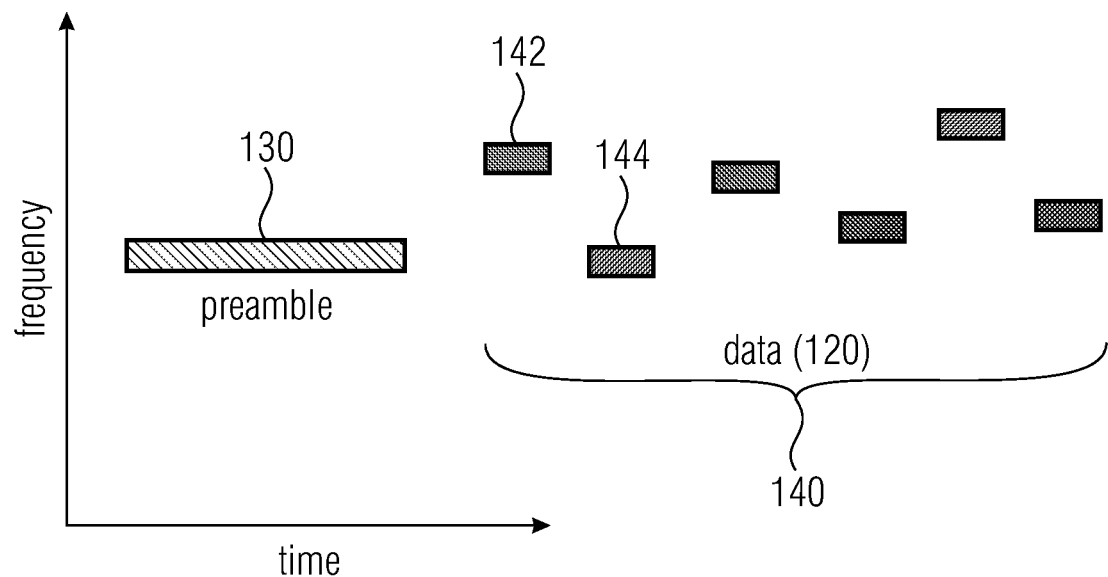
FIG. 2 shows, in diagram, an arrangement of the reference signal relative to the data transmitted by means of a frequency and time hopping pattern, wherein the reference signal is temporally arranged before the data 120.

In a diagram, FIG. 2 shows in detail an arrangement of the reference signal 130 relative to the data 120 transmitted by means of a frequency and time hopping pattern 140, wherein the reference signal 130 is temporally arranged before the data 120. The ordinate describes the frequency, and the abscissa describes time.

As is shown in FIG. 2, the reference signal may be a preamble 130. The preamble 130 may be transmitted en bloc. The preamble 130 may be transmitted before the data 120 (in data packets 142 and 144).

In other words, FIG. 2 shows a setup of a telegram comprising a classic preamble 130 and the data 120 with telegram splitting.

The preamble 130 may typically have a length different than that of the data hops (data packets or subdata packets) 142 and 144. Additionally, the case may occur wherein the lengths of the data hops 142 and 144 vary and are therefore not constant.

The hops 142 and 144 may (just like before) have further preambles contained therein. Thus, the preamble 130 exists additionally.

In embodiments, no spreading of the payload occurs. In addition, the payload may be transferred with error protection.

In embodiments, the preamble 130 may be smaller or equal in width in relation to the data 120. In other words, a data rate at which the preamble 130 is transferred may be different from or equal to a data rate at which the data 120 (or the data packets 142 and 144) is transferred.

In embodiments, the preamble 130 may be transferred en bloc (on the transmitter side or on the waveform side). The data 120 may be distributed in time and, optionally, in frequency by means of the telegram splitting method.

In embodiments, the preamble 130 which has been transmitted (in a prepended manner) may be used for detection (on the receiver side or on the decoder side). Once detection has been performed, the data 120 may be received, or cut out from a buffer and subjected to symbol recovery, in accordance with the hopping pattern in time and frequency.

Second Detailed Embodiment

When a coordinated system is employed, the data 120 cannot be transmitted on the previously transmitted preamble but on the basis of the beacon of the base station.

Therefore, the reference is no longer (a previously) transmitted signal but a received one. However, the approach may be the same, the data 120 may be distributed in time and frequency by means of the telegram splitting method on the basis of the beacon.

The advantage here is also an increase in immunity to interference in case several transmitters occupy the same frequency resource. Due to the coordination of the system, the access method in question is slotted ALOHA.

In embodiments, a bidirectional system with transmission of a reference signal (beacon) may be employed (on the transmitter side or on the waveform side). The data 120 may be distributed in time and, optionally, in frequency by means of the telegram splitting method and may be transmitted at the time and, optionally, at the frequency of the beacon.

In embodiments, a transmitted reference signal (beacon) may be employed (on the receiver side or decoder side) for detection. Following successful detection of the beacon, the data 120 may be received in time and frequency, or cut out from a buffer and subjected to symbol recovery, in accordance with the hopping pattern.

Third Detailed Embodiment

The data hops 142 and 144 need not necessarily be transferred after the preamble 130. It is also possible to add the data 120 before the preamble 130 (to prepend the data 120). It would also be feasible to transmit the data 120 in a different channel in parallel with the preamble 130.

Generally, any combination of the previous methods is possible, e.g., to add data 120 before and after the preamble 130.

It is only useful for the receiver 110 to know the positions of the data hops 142 and 144 relative to the preamble 130. The hops 142 and 144 may optionally be distributed in frequency by means of frequency hopping. This approach is illustrated in FIG. 3.

Figure 3:
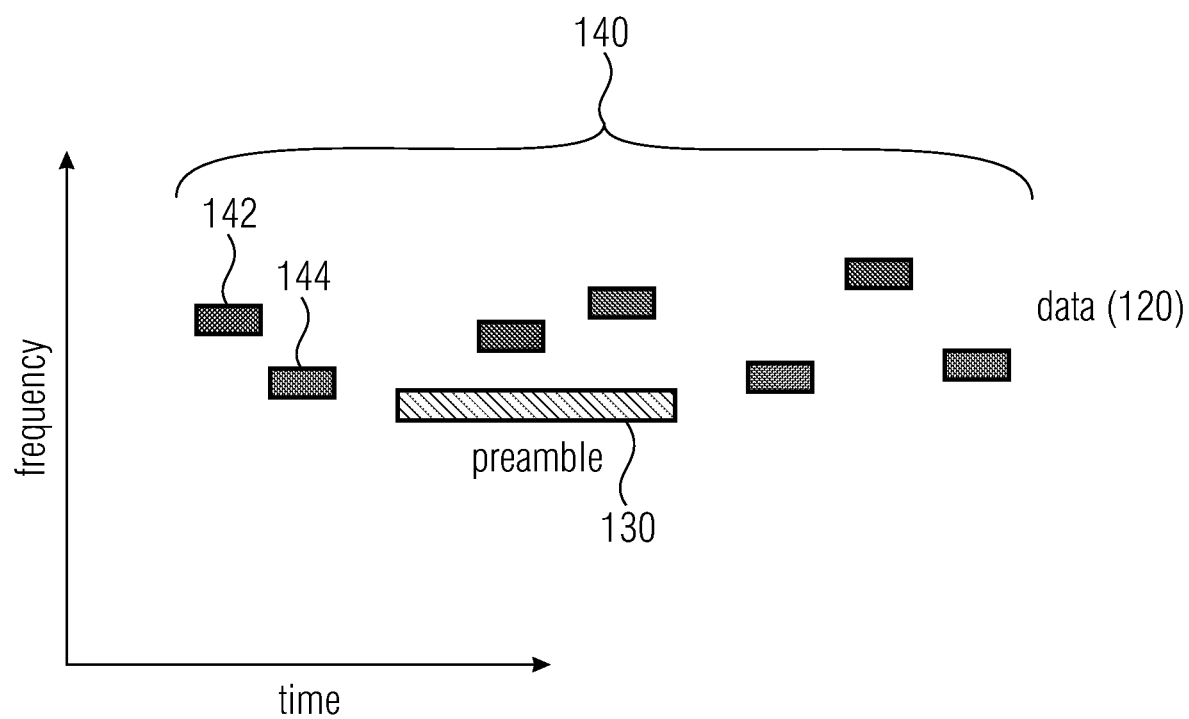
FIG. 3 shows, in a diagram, an arrangement of the reference signal relative to the data transmitted by means of a frequency and time hopping pattern, wherein the reference signal is temporally arranged in between the data such that transmission of the reference signal is not superimposed by transmission of the data.

In a diagram, FIG. 3 shows in detail an arrangement of the reference signal 130 relative to the data 120 transmitted by means of a frequency and time hopping pattern 140, wherein the reference signal 130 is temporally arranged between the data 120. The ordinate describes the frequency, and the abscissa describes time.

As shown in FIG. 3, the reference signal may be a preamble 130. The preamble 130 may be transferred en bloc. The preamble 130 may be sent out, at least in portions, in between the data 120 (or data packets 142 and 144) such that transmission of the preamble 130 is not superimposed by transmission of the data 120.

In other words, FIG. 3 shows a setup of a telegram with a classic preamble 130 and the data 120 with telegram splitting, wherein the data 120 need not necessarily be transmitted after the preamble 130.

The advantage of this method is in the prolonged coherence time since utilization now is possible in both directions (before and after the preamble 130).

In the embodiments, the preamble 130 may be transmitted en bloc (on the transmitter side or waveform side), the data 120 being distributed in time and, optionally, in frequency before, after and/or during the preamble 130 by means of the telegram splitting method.

In embodiments, the preamble 130 that has been transmitted (in a prepended manner) may be used (on the receiver side or decoder side) for detection. Once detection has been performed, the data 120 may be cut out in time and frequency in accordance with the hopping pattern.

Fourth Detailed Embodiment

To be able to perform detection at a low signal/noise ratio (SNR) as well, the data rate may be adapted in accordance with the preamble length. This means that the data rate of the preamble 130 generally differs from that of the data 120 transmitted by means of the telegram splitting method. Such a setup is shown in FIG. 4.

Figure 4:
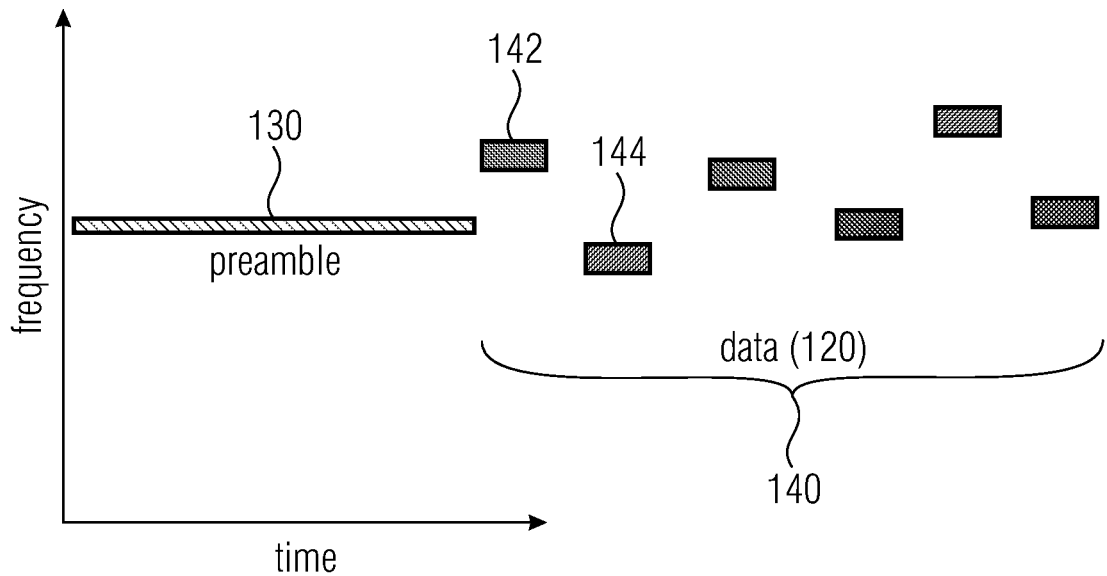
FIG. 4 shows, in a diagram, an arrangement of the reference signal relative to the data transmitted by means of a frequency and time hopping pattern, wherein the reference signal is temporally arranged before the data, the reference signal being transmitted at a data rate lower than that used for the data.

In a diagram, FIG. 4 shows in detail an arrangement of the reference signal 130 relative to the data 120 transferred by means of a frequency and time hopping pattern 140, wherein the reference signal 130 is temporally arranged before the data 120. The ordinate describes the frequency, and the abscissa describes time.

As shown in FIG. 4, the reference signal may be a preamble 130. The preamble 130 may be transferred en bloc. The preamble 130 may be transferred before the data 120 (in data packets 142 and 144). The preamble 130 may be transferred at a lower data rate than that used for the data 120. The lower data rate of the preamble 130 as compared to the data 120 is indicated in FIG. 4 by the width of the signal in the direction of the frequency.

In other words, FIG. 4 shows a setup of a telegram with a classic preamble 130, the data 120 with telegram splitting, the data rate of the preamble having been reduced.

For example, for a typical preamble length within the range from 16 to 32 symbols, the data rate of the preamble 130 may be lower, approximately by the factor of 10 to 20, than the data rate of the data 120, which is coded at a lower code rate of the FEC (forward error correction) and is transferred by means of telegram splitting.

In embodiments, the preamble 130 may be transferred en bloc (on the transmitter side or on the waveform side), the data 120 being transferred by means of the telegram splitting method. The data rate of the preamble 130 may vary from that used for the data 120.

In embodiments, following detection, one may employ (on the receiver side or decoder side) a different data rate for decoding and may thus, e.g., change the sampling rate or switch the matched filter.

Fifth Detailed Embodiment

Some types of modulation may be detected in a relatively simple manner. Others, in contrast, exhibit better performance with regard to bandwidth efficiency and noise influences.

By splitting the telegram into the preamble 130 and the data 120, the types of modulation for both methods may also be selected independently of each other. As a result, the best modulation methods for detection and the data may be selected independently of each other in accordance with the application.

For example, BPSK (binary phase-shift keying) may be employed for synchronization, whereas MSK (minimum shift keying) may be employed for the data.

In embodiments, the preamble 130 may have (on the transmitter side or waveform side) a different type of modulation than that of the data 120.

In embodiments, following detection, one may employ (on the receiver side or decoder side) a different data rate for decoding and may thus, e.g., change the sampling rate or switch the matched filter.

Sixth Detailed Embodiment

The above idea may even be expanded by employing even a completely different transmission method for the preamble/synchronization 130. In principle, any combination is possible, be it a spreading method, narrow-band or OFDM (orthogonal frequency-division multiplexing).

Figure 5:
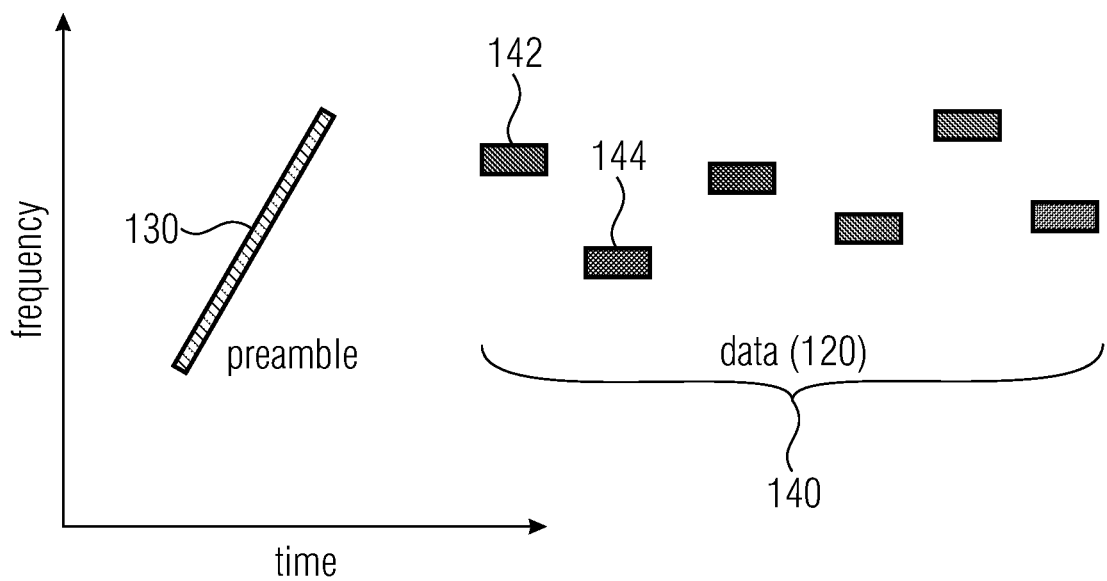
FIG. 5 shows, in a diagram, an arrangement of the reference signal relative to the data transmitted by means of a frequency and time hopping pattern, wherein the reference signal is temporally arranged before the data, and wherein the reference signal is spread in the frequency domain.

For example, a spreading method as shown in FIG. 5 may be used for synchronization.

In detail, FIG. 5 shows, in a diagram, an arrangement of the reference signal 130 relative to the data 120 transmitted by means of a frequency and time hopping pattern 140, wherein the reference signal 130 is temporally arranged before the data 120, and the reference signal 130 being spread in the frequency domain. The ordinate describes the frequency, and the abscissa describes time.

As shown in FIG. 5, the reference signal may be a preamble 130. The preamble 130 may be transferred en bloc. The preamble 130 here may be transferred before the data 120 (in the data packets 142 and 144). For the preamble 130, a chirp spread spectrum (CSS) method may be used, whereas the data 120 may be transferred in the normal manner by means of the telegram splitting method. Alternatively, a normal frequency hopping method may be employed instead of the telegram splitting method, so that no pauses (transmission pauses) are made between the partial packets 142 and 144.

In other words, FIG. 5 shows a setup of a telegram comprising a preamble 130, the data 120 with telegram splitting, the preamble 130 having been modulated by means of a CSS method (CSS=chirp spread spectrum).

Thus, a CSS preamble may be employed for detection, whereas the data may be transferred by means of UNB modulation. The data 120 is not transmitted en bloc at one frequency, however, but is distributed over time and frequency by means of frequency hopping and/or telegram splitting. This results in the major advantage of the even higher immunity to interference with non-coordinated transmission (e.g. ALOHA or slotted ALOHA). The advantage also applies to a coordinated system since by means of the frequency hopping method and the telegram splitting method, portions of the telegram cannot be transmitted when two partial packets 142 and 144 are transmitted at the same frequency at the same time; said portions may be restored by the receiver 110 by means of error correction.

In embodiments, the method of transmitting the preamble 130 may not be identical (on the transmitter side or waveform side) with the method of transmitting the data 120.

In embodiments, a different method of recovering the symbols may be employed (on the receiver side or decoder side) for decoding following detection.

Seventh Detailed Embodiment

With the previous methods, synchronization may be detected with a moderate amount of computed expenditure; however, the problem concerning immunity to interference remains. If, in the above cases, an interferer is active within the same frequency band as the reference signal during transmission and if said interferer exhibits higher power at the receiver, the telegram typically cannot be detected.

To counteract this problem, one may transmit not only a preamble 130, but one will insert a preamble 130 from time to time before and/or after and/or in between the data 120. This is shown in FIG. 6.

Figure 6:
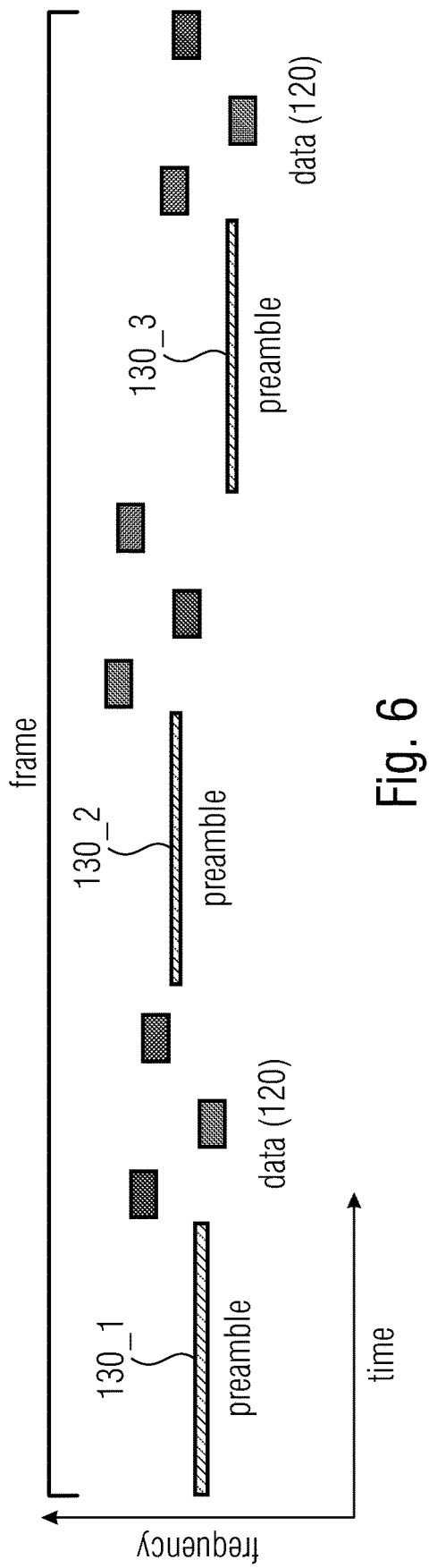
FIG. 6 shows, in a diagram, an arrangement of three reference signals relative to the data transmitted by means of a frequency and time hopping pattern, wherein the reference signals are temporally arranged in between the data such that transmission of the reference signals is not superimposed by transmission of the data.

In a diagram, FIG. 6 shows in detail an arrangement of three reference signals 130_1 to 130_3 relative to the data 120 transmitted by means of a frequency and time hopping pattern 140, the reference signals 130_1 to 130_3 being temporally arranged between the data 120 such that transmission of the reference signals 130_1 to 130_3 is not superimposed by transmission of the data 120. The ordinate describes the frequency, and the abscissa describes time.

As shown in FIG. 6, the reference signals 130_1 to 130_3 may be preambles. The preambles 130_1 to 130_3 may each be transferred en bloc.

In other words, FIG. 6 shows a setup of a telegram comprising several preambles 130_1 to 130_3 and the data 120, which is transmitted by means of telegram splitting.

If one of the preambles 130_1 to 130_3 is not found due to the interference, only a portion of the telegram will be lost, and the remainder may be recovered by means of a forward error correction as employed in telegram splitting.

However, in contrast to telegram splitting it is to be stated that here, every preamble may be detected by itself with a similar (with a difference of only few dB) signal/noise ratio (SNR) as compared to the signal/noise ratio (SNR) that may be used for decoding.

In embodiments, several preambles 130_1 to 130_3 may be introduced (on the transmitter side or waveform side) into a packet (or telegram); however, they need not have the same data rate or the same modulation method as that used for the data 120.

In embodiments, each preamble 130_1 to 130_3 may be decoded by itself (on the receiver side or decoder side), wherein the data may be decoded in accordance with detection. If a portion of the telegram is missing, this may be inserted into the reception data stream prior to forward error correction (FEC).

Eighth Detailed Embodiment

Figure 7:
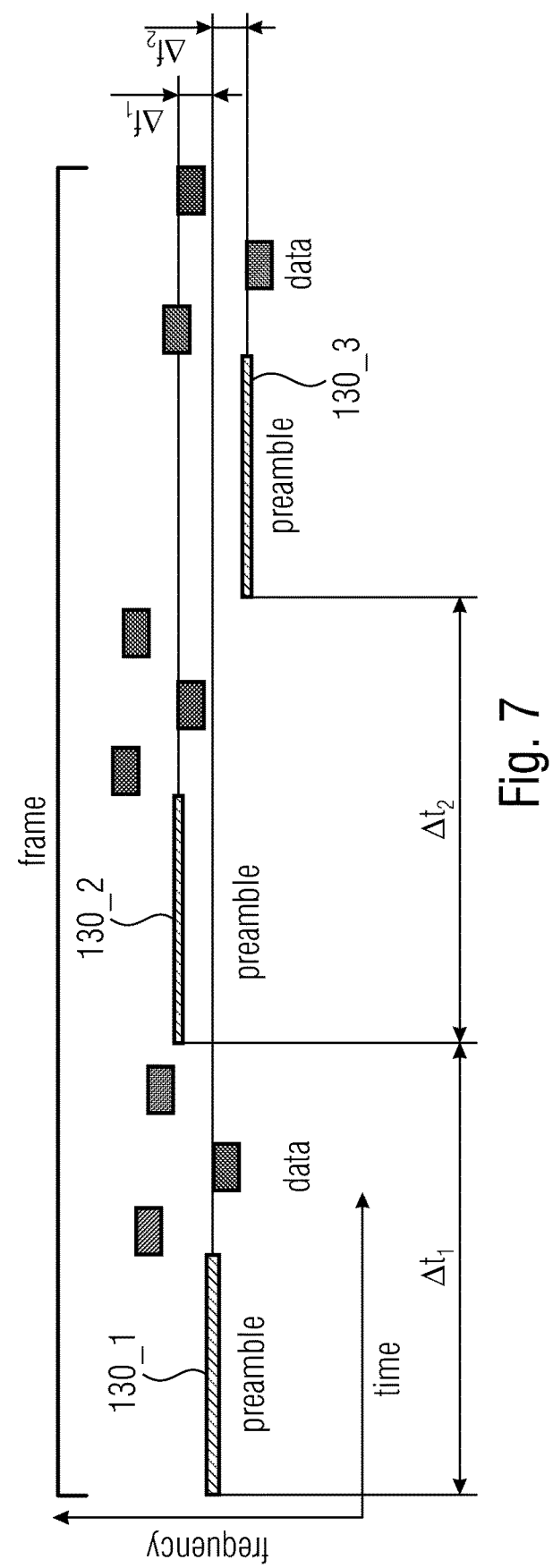
FIG. 7 shows, in a diagram, an arrangement of three reference signals relative to the data transmitted by means of a frequency and time hopping pattern, wherein the reference signals are temporally arranged in between the data such that transmission of the reference signals is not superimposed by transmission of the data, and wherein the reference signals exhibit a fixedly defined mutual time interval and frequency interval.

Similarly to telegram splitting, the pauses and the frequency hops between the preambles 130_1 to 130_3 may be defined, as shown in FIG. 7.

In a diagram, FIG. 7 shows in detail an arrangement of three reference signals 130_1 to 130_3 relative to the data 120 transmitted by means of a frequency and time hopping pattern 140, the reference signals 130_1 to 130_3 being temporally arranged between the data 120 such that transmission of the reference signals 130_1 to 130_3 is not superimposed by transmission of the data 120, and the reference signals 130_1 to 130_3 having a fixed time interval and frequency interval in relation to one another. The ordinate describes the frequency, and the abscissa describes time.

As shown in FIG. 7, the reference signals 130_1 to 130_3 may be preambles. The preambles 130_1 to 130_3 may be transferred en bloc, respectively. In addition, the reference signals 130_1 to 130_3 have a fixed time interval $\Delta t_1$ and $\Delta t_2$ and frequency interval $\Delta f_1$ and $\Delta f_2$ in relation to one another, respectively.

This offers the advantage that in case a preamble is interfered with (e.g. the first preamble 130_1), one may nevertheless infer all data hops 142 and 144. Thus, the immunity of the data 120 to inference is increased as compared to the previous case.

However, in contrast to telegram splitting, every preamble 130_1 to 130_3 is still detectable by itself with a similar (with a difference of only few dB) signal/noise ratio (SNR) as compared to the signal/noise ratio (SNR) that may be used for decoding. This means that detection also works with only one single preamble, in contrast to the telegram splitting method. A further advantage in coupling the preambles 130_1 to 130_3 with one another by a defined pattern lies in the fact that in the event of successful detection (e.g. of the first preamble 130_1), the remaining preambles (second preamble 130_2 and third preamble 130_3) need no longer be detected and, therefore, further computing power is saved.

With low signal/noise ratio (SNR) values, there is additionally the possibility of combining the individual detection results of each preamble into a total detection probability.

In embodiments, several preambles 130_1 to 130_3 may be introduced (on the transmitter side or decoder side) into a packet (or telegram). In between said preambles 130_1 to 130_3 there is a defined time and frequency pattern.

In embodiments, each preamble 130_1 to 130_3 may be decoded by itself (on the transmitter side or waveform side). However, on the ground of a received preamble, the receiver 110 cannot infer the non-detected preambles and may therefore use all data for decoding. In addition, detection may be terminated once a preamble has been received.

Ninth Detailed Embodiment

If the time intervals between the preambles 130_1 to 130_3 are known, it will suffice to detect only one of the preambles, as shown in the previous example.

Instead of sending out all preambles 130_1 to 130_3 at the same data rate and by means of the same modulation method, both modulation and the data rates of the individual preambles 130_1 to 130_3 may be varied. For example, for simple receivers a preamble may be employed that is simple to detect. For more complex receivers, there is more computationally intensive detection by using a further preamble.

If, as was described in the second detailed embodiment, the data rate of the preamble is reduced, this will result in that time resolution of the detection will be degraded in accordance with the factor by which the data rate is reduced. By means of the above-described approach, however, full accuracy may nonetheless be achieved with two preambles without involving any large computing expenditure. To this end, "coarse" synchronization is initially performed by using the simple method, and if a preamble has been found, fine detection may be calculated on the basis of the other preamble.

Depending on the performance category, there are the following four possibilities of detection. Firstly, low-power detection on the basis of the preamble that is easy to find. Secondly, low-power detection on the basis of the preamble that is easy to find and, subsequently, fine detection on the basis of the previous detection. Thirdly, high-power detection on the basis of the more complex preamble. Fourthly, a combination of the high-power detection on the basis of the more complex preamble and of the low-power detection on the basis of the preamble easy to find.

In embodiments, various types of modulation and/or various data rates may be employed (on the transmitter side or waveform side) for the preambles.

Tenth Detailed Embodiment

Instead of the possibility, described in the ninth detailed embodiment, of using different preambles for different receivers, one may also insert a so-called pre-preamble (i.e. pre-amble) and/or post-preamble (i.e. post-amble) and/or mid-preamble (i.e. mid-amble) which is easy to detect.

Here, the actual preamble has a further preamble prepended to it which may be detected without involving any large computing expenditure but provides a relatively low level of temporal accuracy. If the pre-preamble is detected, only a small temporal search area remains to be searched for the actual preamble.

Typically, the pre-preamble has a data rate different from that of the actual preamble. The data rate is typically reduced further so that the before pre-preamble will be easier to detect.

The length of the pre-preamble may deviate from the length of the actual preamble. It is also possible to select a different type of modulation.

As compared to the previous method, this method has the advantage that all preambles are detected even with a simple receiver.

In embodiments, a further sequence known to the receiver may be transmitted (on the transmitter side or waveform side) prior to the actual preamble.

In embodiments, pre-detection may be performed (on the receiver side or decoder side), and if it is successful, further, more refined detection may be performed within a certain search area.

Eleventh Detailed Embodiment

Figure 8:
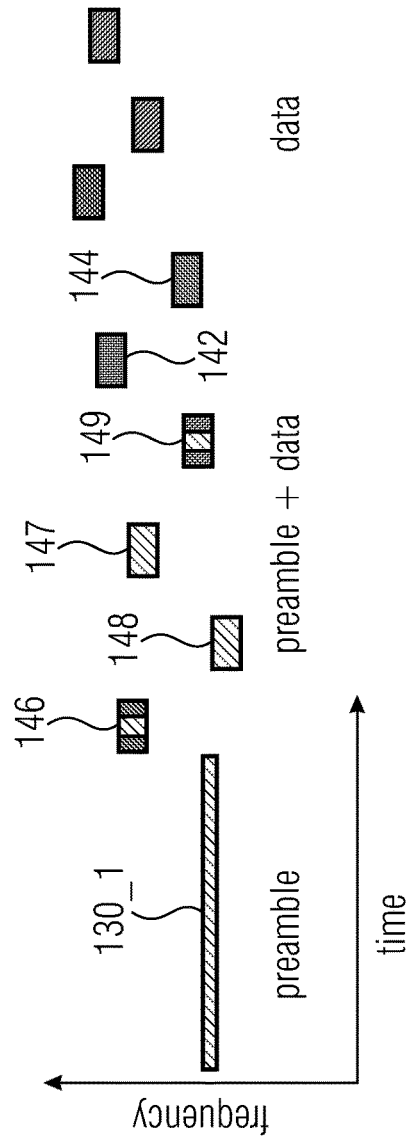
FIG. 8 shows, in a diagram, an arrangement of a reference signal relative to the data transmitted by means of a frequency and time hopping pattern, wherein the reference signal is temporally arranged before the data, wherein the data packets are provided with additional synchronization sequences.

In order to obtain, in the event of interferences, a higher level of detectability with sufficient computing power and/or to obtain temporally accurate synchronization and/or improved frequency estimation, synchronization sequences may also be introduced into the hops in addition to the preambles, or additional synchronization hops only may be introduced into the telegram, as shown in FIG. 8.

FIG. 8 shows in detail, in a diagram, an arrangement of a reference signal 130 relative to the data 120 transferred by means of a frequency and time hopping pattern 140, wherein the reference signal 130 is temporally arranged before the data 120, the data packets (hops) being provided with additional synchronization sequences. The ordinate describes the frequency, and the abscissa describes time.

As shown in FIG. 8, the reference signal 130 may be a preamble. The preamble 130 may be transferred en bloc. In addition, the data packets are provided, at least in portions, with synchronization sequences, so that in addition to the data packets 142 and 144 comprising data only, there are also data packets 146 and 149 which comprise both data and synchronization sequences, as well as data packets 147 and 148 which comprise synchronization sequences only.

In other words, FIG. 8 shows a combination of a preamble 130 for coarse detection and, in the hops 146 to 149, synchronization sequences for fine detection.

The preamble 130 would then be employed for the purpose of coarse packet detection and would have to meet this criterion only. As a result, the length of the preamble may be clearly reduced in most cases.

If enough computing power is present within a receiver, there is the possibility of calculating the direction directly on the basis of the synchronization sequences in the hops 146 to 149. This offers the advantage of improved immunity to interference in during detection.

In embodiments, further synchronization sequences may be introduced (on the transmitter side or waveform side) into the hops, or synchronization hops only may be introduced into the telegram, in addition to the actual preamble 130.

In embodiments, pre-detection may be performed (on the receiver side or decoder side), and if said pre-detection is successful, further finer detection may be performed within a certain search area. High-performance receivers may calculate detection directly on the basis of the hops.

Twelfth Detailed Embodiment

If so-called repetition of the data is employed, the data may be merged into a total result by means of MRC (maximal-ratio combining) or other techniques. This heavily increases the immunity of the data to interference, but also the performance against noise, depending on the number of repetitions used. A good guide value that has been established from practical use includes three repetitions.

Instead of having new data with each new preamble, the data here is repeated. In case the intervals between the preambles are known, it will suffice here, too, that with no more than one correctly detected preamble, the positions of all the other ones may be calculated. Otherwise, at least two preambles of the same data may be detected for the MRC.

Figure 9:
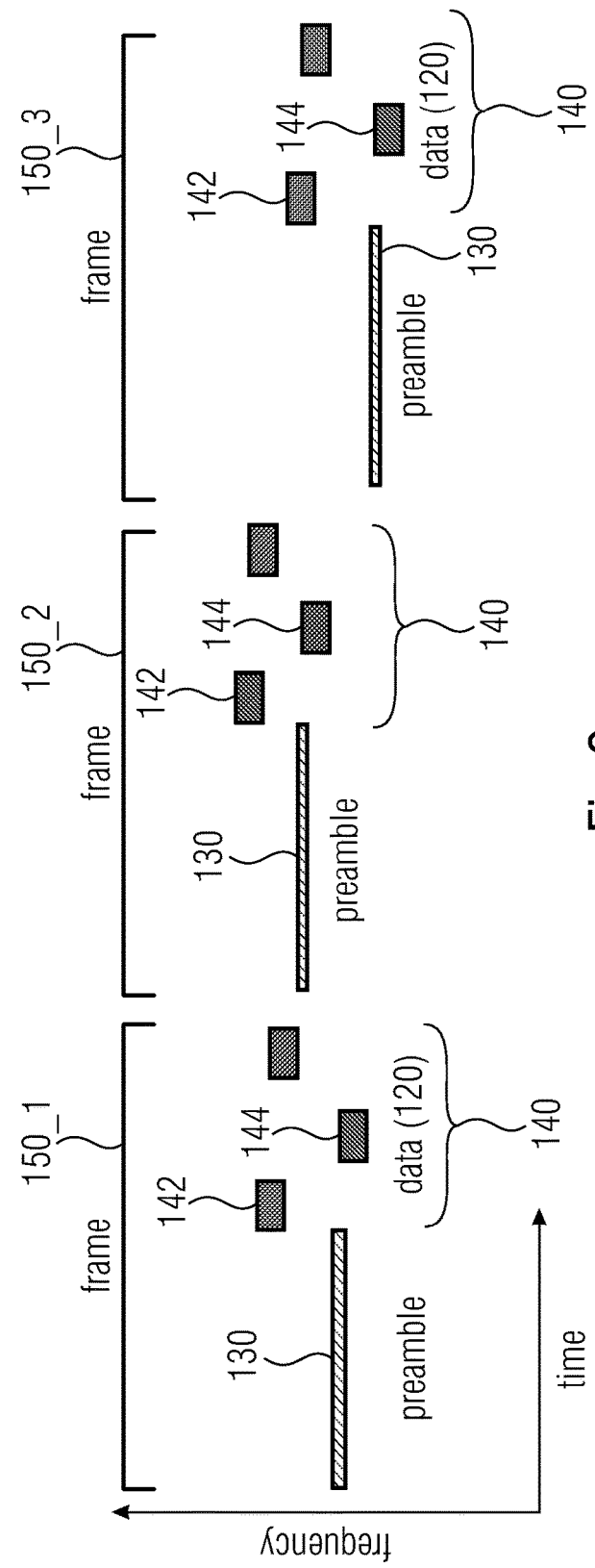
FIG. 9 shows, in a diagram, repeating arrangements of reference signals and data transmitted by means of frequency and time hopping patterns, wherein the reference signal is temporally arranged before the data in each case.

Unlike the fifth detailed embodiment, each frame again consists only of one preamble and the associated data, as is shown in FIG. 9.

In a diagram, FIG. 9 shows in detail a repeating arrangement of a reference signal 130 and data 120 transmitted by means of a frequency and time hopping pattern 140, wherein the reference signal 130 is temporally arranged before the data 120 in each case. The ordinate describes the frequency, and the abscissa describes time.

As shown in FIG. 9, the reference signal 130 may be a preamble. The preamble 130 may be transmitted en bloc. By way of example, the arrangement of the reference signal 130 and the data 120 is repeated three times in FIG. 9; arrangement of the reference signal 130 and the data 120 may be shifted in frequency in the repetition. In FIG. 9, the repeating arrangement of the reference signal 130 and the data 120 is referred to as a frame 150_1 to 150_3.

In other words, FIG. 9 shows a setup of a telegram with three-fold repetition of the frames 150_1 to 150_3.

FIG. 9 also shows that the frames 150_1 to 150_3 are transmitted several times in a very simple manner. Here it is not necessary for the repetition to take place at the same frequencies. The time intervals between the frames may also vary. It is also possible to employ a different hopping pattern if it is known to the receiver.

In embodiments, the same data may be transmitted several times (on the transmitter side or waveform side).

In embodiments, the decoder may combine (on the receiver side or decoder side) information from all repetitions received to form one overall telegram.

Thirteenth Detailed Embodiment

Figure 10:
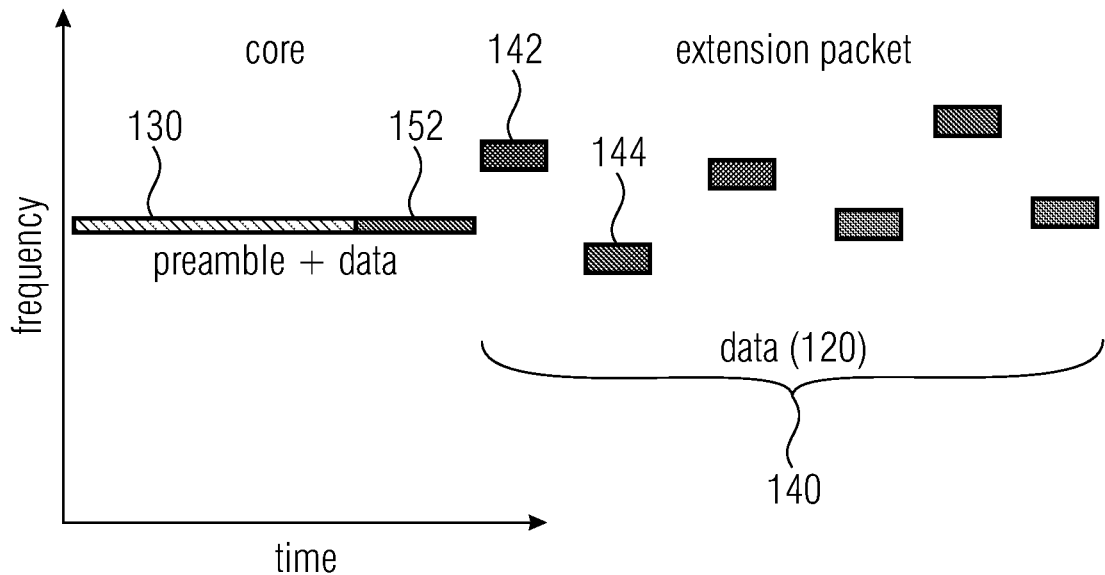
FIG. 10 shows, in a diagram, an arrangement of the reference signal relative to the data transmitted by means of a frequency and time hopping pattern, wherein the reference signal is temporally arranged before the data, and wherein further data is transmitted along with the reference signal.

In a diagram, FIG. 10 shows an arrangement of the reference signal 130 relative to the data 120 transmitted by means of a frequency and time hopping pattern 140, wherein the reference signal 130 is temporally arranged before the data 120, and wherein further data 152 is transferred together with the reference signal 130. The ordinate describes the frequency, and the abscissa describes time.

As shown in FIG. 10, the reference signal may be a preamble 130. The preamble 130 may be transferred en bloc. The preamble 130 may be transferred before the data 120 (in the data packets 142 and 144). The preamble may have further data 152 appended to it.

In other words, FIG. 10 shows a setup of a telegram consisting of a core sequence (preamble 130 and further data 152) and an extension sequence (data with telegram splitting).

As can be seen in FIG. 10, the preamble 130 may be extended by a data field 152, or the data may also be introduced into the preamble. This data field forms, along with the preamble, a so-called core packet or core sequence. For example, if there are only very few data for transmission, consequently there is no absolute need, with very little data at hand, to generate and transmit the split hops.

However, since the core data is very prone to interference by being appended to the preamble, the information should be protected by repetition. Therefore, it would also be possible here to repeat only the information within the core packet since the data already exhibits improved immunity to interference because of telegram splitting.

If data hops 142 and 144 are appended to the core packet, said data hops will also be referred to as an extension packet or extension sequence.

In embodiments, unknown payload may be added (on the transmitter side or waveform side) after (appended to) the preamble 130 (before, during or after the preamble 130).

In embodiments, the decoder may extract the transmitted information (on the receiver side or decoder side) from two different areas. Here, decoding may be performed in separate steps or altogether.

Fourteenth Detailed Embodiment

Figure 11:
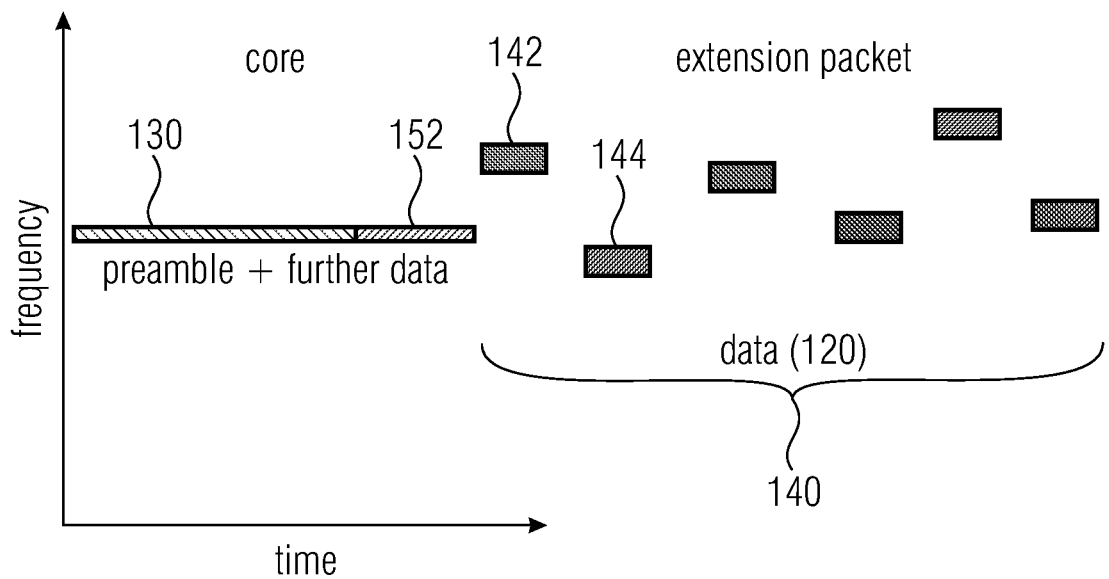
FIG. 11 shows, in a diagram, an arrangement of the reference signal relative to the data transmitted by means of a frequency and time hopping pattern, wherein the reference signal is temporally arranged before the data, and wherein further data is transmitted along with the reference signal, the further data containing information, e.g., about the frequency and time hopping pattern or the length.

FIG. 11 shows, in a diagram, an arrangement of the reference signal 130 relative to the data 120 transmitted by means of a frequency and time hopping pattern 140, wherein the reference signal 130 is temporally arranged before the data 120, and wherein further data 152 is transmitted along with the reference signal 130. The ordinate describes the frequency, and the abscissa describes time.

As shown in FIG. 11, the reference signal may be a preamble 130. The preamble 130 may be transmitted en bloc. The preamble 130 may be transmitted before the data 120 (in the data packets 142 and 144). The preamble may have further data 152 added to it. The further data 152 may contain information regarding the frequency hopping pattern and/or time hopping pattern.

In other words, FIG. 10 and/or FIG. 11 show a setup of a telegram consisting of a core sequence (preamble 130 and header 152) and an extension sequence (data with telegram splitting).

Instead of the preamble 130 being followed by payload only, therefore, also a portion of the information or the entire information within the core packet may be used for defining further transmission parameters of the extension.

In this manner, e.g. the data rate, the hopping pattern (time and frequency), the hop lengths or the frequency band employed may be signaled.

The advantage of signaling the subsequent extension consists in that the temporal location and the pattern may be freely configured. Thus, with each transmission, a random hopping pattern may be selected for transmitting the data. This enormously increases transmission reliability. If the transmitter has information about other transmissions or interferers available to it, it can adapt the pattern such that superpositions will be avoided.

If a base station is to respond to two sensor nodes at the same time, for example, this will be possible with different hopping patterns without resulting in complete superposition. In addition, the base stations may combine transmissions to several subscribers and may thus perform carrier aggregation (CA).

In embodiments, payload which is unknown to the receiver and may be used (in portions) for signaling may be added after the preamble (on the transmitter side or waveform side).

In embodiments, the decoder may extract the transmitted information (on the receiver side or decoder side) from two different areas. Here, the information from the core is employed (in portions) for generating the hopping patterns, hop lengths etc. of the extension sequence.

Even though in the above embodiments one assumes that the reference signal is a preamble, the invention is not limited to such embodiments. Rather, the reference signal may also be a beacon, in which case the above embodiments apply by analogy.

Fifteenth Detailed Embodiment

Instead of signaling the extension within the core, it is also possible to signal the positions of the other core sequences. To this end, each core sequence comprises different information so that will be possible to infer any other core sequence, as shown in FIG. 12.

Figure 12:
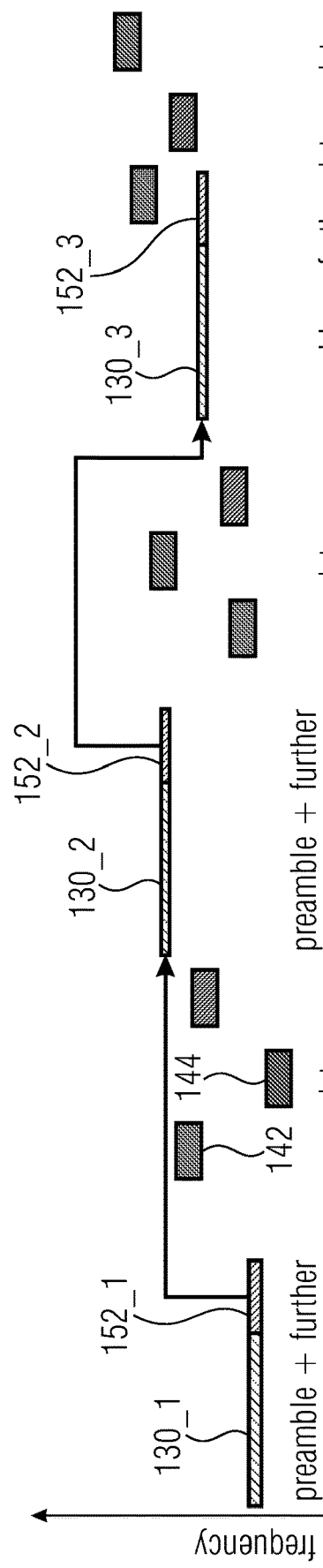
FIG. 12 shows, in a diagram, an arrangement of three reference signals relative to the data transmitted by means of a frequency and time hopping pattern, wherein the reference signals are temporally arranged in between the data such that transmission of the reference signals is not superimposed by transmission of the data, the reference signals being transmitted along with further data in each case.

In a diagram, FIG. 12 shows an arrangement of three reference signals 130_1 to 130_3 relative to the data 120 transmitted by means of a frequency and time hopping pattern 140, wherein the reference signals 130_1 to 130_3 are temporally arranged in between the data 120 such that transmission of the reference signals 130_1 to 130_3 is not superimposed by transmission of the data, the reference signals 130_1 to 130_3 being transmitted together with further data 152_1 to 152_3, respectively. The ordinate describes the frequency, and the abscissa describes time.

As shown in FIG. 12, the reference signals may be preambles 130_1 to 130_3. The preambles 130_1 to 130_3 may be transmitted en bloc, respectively. The preambles 130_1 to 130_3 may be transmitted in between the data 120 in temporal terms such that preambles 130_1 to 130_3 are not superimposed by data. The preambles 130_1 to 130_3 may have further data 152_1 to 152_3 appended to them, respectively. The further data 152_1 to 152_3 may contain information regarding the other preambles 130_1 to 130_3 and/or further data 152_1 to 152_3 and/or information regarding the data 142, 146.

In other words, FIG. 12 shows a setup of a telegram consisting of a core sequence (preamble and header) and an extension sequence (data with telegram splitting), the positions of the preambles being signaled in the header.

For example, three core sequences may be employed per telegram. Thus, the information about the second and third core sequences relative to the first core sequence may be defined and introduced in the first core sequence. This applies by analogy to the other two core sequences.

This method offers the major advantage that the intervals between the preambles/core sequences need not be identical across all telegrams. If several subscribers simultaneously transmit telegrams which use the same hopping pattern for the individual core sequences, this frequently results in complete superpositions. If the hopping patterns of the core sequences of the telegrams are distributed at random, the probability of complete superposition heavily decreases. Therefore, far more telegrams may be transmitted.

In embodiments, payload which is unknown to the receiver and may be used (in portions) for signaling may be added after the preamble (on the transmitter side or waveform side).

In embodiments, the decoder may extract the transmitted information (on the receiver side or decoder side) from two different areas. Here, the information from the core is employed (in portions) for generating the hopping patterns, hop lengths etc. of the extension sequence.

Further Embodiments

Figure 13:
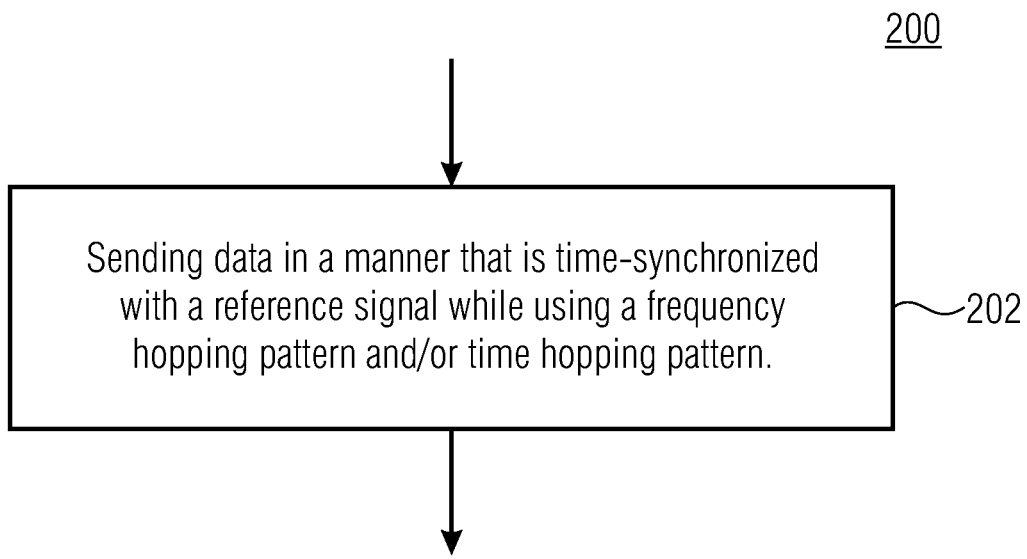
FIG. 13 shows a flow chart of a method of transmitting data, in accordance with an embodiment.

FIG. 13 shows a flow chart of a method 200 of transmitting data in accordance with an embodiment. The method 200 includes a step 202 of sending data in a manner that is time-synchronized with a reference signal while using a frequency hopping pattern and/or time hopping pattern.

Figure 14:
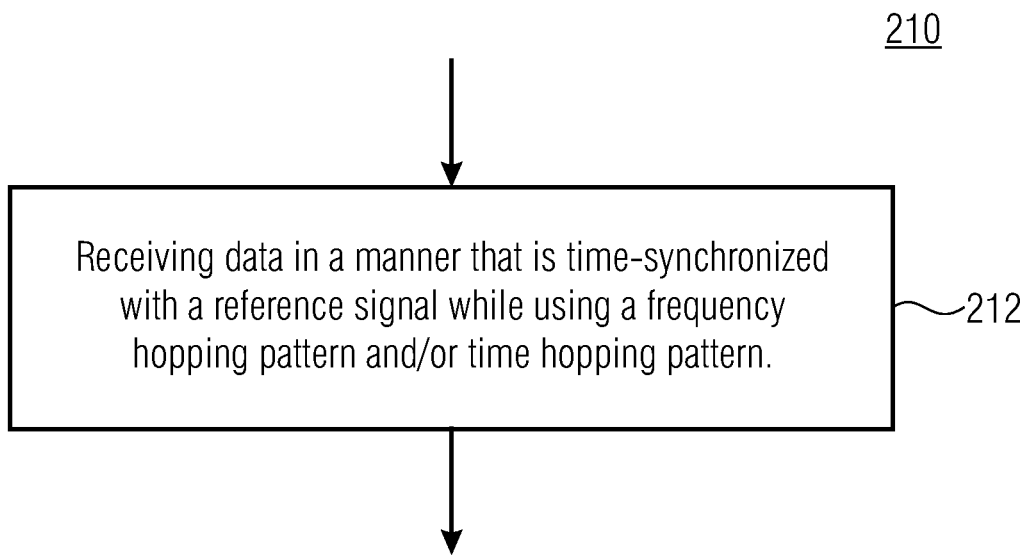
FIG. 14 shows a flow chart of a method of receiving data, in accordance with an embodiment.

FIG. 14 shows a flow chart of a method 210 of receiving data. The method 210 includes a step 212 of receiving data in a manner that is time-synchronized with a reference signal while using a frequency hopping pattern and/or time hopping pattern.

In embodiments, a preamble that is easy to detect and the telegram splitting method are combined.

In embodiments, several preambles that are easy to detect are combined.

In embodiments, signaling information or payload are introduced into the preamble that is easy to detect.

Embodiments provide a system for transmitting data from many sensor nodes to one base station. The concepts described herein, however, may be used for any transmission if the channel is not coordinated (ALOHA or slotted-ALOHA access method) and if the receiver therefore does not know when a packet is transmitted. Additionally, this may result in superpositions with other subscribers, which causes interferences during transmission.

In this context, the radio transmission band used may, but need not, be exclusively reserved for said transmission. The frequency resource may be shared with many further systems, which renders reliable transmission of the information more difficult.

The embodiments provide techniques by means of which classic receivers may be extended by the telegram splitting method without having to perform more effortful detection of the telegrams.

Here, various combinations regarding data rates, modulation methods and lengths of the preamble and the data may be applied. In addition, it is possible to split up a telegram into a core sequence and an extension sequence, wherein the core sequence may be used as signaling, among others. If more than one preamble is transmitted, the performance of the system as compared to known algorithms may be improved even more by means of skillful combination.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device) such as a microprocessor, a programmable computer or an electronic circuit, for example. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium or the computer-readable medium are typically concrete and/or non-transitory and/or non-transient.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU) or a graphics card (GPU), or may be a hardware specific to the method, such as an ASIC.

The devices described herein may be implemented, e.g., while using a hardware apparatus or while using a computer or while using a combination of a hardware apparatus and a computer.

The devices described herein or any components of the devices described herein may be implemented, at least partly, in hardware or in software (computer program).

The methods described herein may be implemented, e.g., while using a hardware apparatus or while using a computer or while using a combination of a hardware apparatus and a computer.

The methods described herein or any components of the devices described herein may be executed, at least partly, by hardware or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A data transmitter configured to send data in a manner that is time-synchronized with a reference signal while using a frequency hopping pattern and/or time hopping pattern,
   wherein the data transmitter is configured to send out the reference signal temporally before the data, such that transmission of the reference signal is not superimposed by transmission of the data,
   wherein the reference signal includes at least two preambles,
   wherein the at least two preambles are transmitted on different frequencies,
   wherein a first preamble of the at least two preambles is transmitted en bloc,
   wherein the data comprises at least two data packets, the data transmitter being configured to send out the at least two data packets in accordance with the frequency hopping pattern and/or time hopping pattern,
   wherein the data is a telegram, the data transmitter being configured to split up the telegram into the at least two data packets, each of the at least two data packets being shorter than the telegram,
   wherein the first preamble is longer than each of the at least two data packets, and
   wherein the second preamble is longer than each of the at least two data packets.

2. Data transmitter as claimed in claim 1, wherein the data comprises preamble symbols.

3. Data transmitter as claimed in claim 1, the data transmitter further being configured to send the data in a manner that is frequency-synchronized with the reference signal while using the frequency hopping pattern and/or time hopping pattern.

4. Data transmitter as claimed in claim 1, the data transmitter being configured to send out the at least two preambles at a data rate lower than that used for the data.

5. Data transmitter as claimed in claim 1, the data transmitter being configured to send out the at least two preambles with a modulation type or a modulation method different than those used for the data.

6. Data transmitter as claimed in claim 1, the data transmitter being configured to transmit further data along with the at least two preambles.

7. Data transmitter as claimed in claim 6, wherein at least a portion of the further data transmitted with the at least two preambles comprises information regarding the frequency hopping pattern and/or time hopping pattern of the data.

8. A data receiver configured to receive data, or extract it from a buffer, while using a frequency hopping pattern and/or time hopping pattern in a manner that is time-synchronized with a reference signal;
   wherein the reference signal is transmitted temporally before the data, such that transmission of the reference signal is not superimposed by transmission of the data, wherein the reference signal includes at least two preambles, wherein the at least two preambles are transmitted on different frequencies, wherein a first preamble of the at least two preambles is transmitted en bloc, wherein a second preamble of the at least two preambles is transmitted en bloc, wherein the data includes at least two data packets, wherein the data receiver is configured to receive the at least two data packets, or to extract them from the buffer, in accordance with the frequency hopping pattern and/or time hopping pattern, wherein the data is a telegram that is split up into the at least two data packets, each of the at least two data packets being shorter than the telegram, wherein the data receiver is configured to combine the at least two data packets in order to obtain the telegram, wherein the first preamble is longer than each of the at least two data packets, and wherein the second preamble is longer than each of the at least two data packets.

9. Data receiver as claimed in claim 8, the data receiver further being configured to receive the data, or extract it from the buffer, while using the frequency hopping pattern and/or time hopping pattern in a manner that is frequency-synchronized with the reference signal.

10. Data receiver as claimed in claim 8, wherein the at least two preambles is received or extracted from the buffer along with further data.

11. Data receiver as claimed in claim 10, wherein the further data that is received or extracted from the buffer along with the at least two preambles comprises information regarding the frequency hopping pattern and/or time hopping pattern; the data receiver being configured to receive the data, or to extract it from the buffer, while using the information regarding the frequency hopping pattern and/or time hopping pattern.

12. System comprising:
a data transmitter configured to send data in a manner that is time-synchronized with a reference signal while using a frequency hopping pattern and/or time hopping pattern, wherein the data transmitter is configured to send out the reference signal temporally before the data, such that transmission of the reference signal is not superimposed by transmission of the data, wherein the reference signal includes at least two preambles, wherein the at least two preambles are transmitted on different frequencies, wherein a first preamble of the at least two preambles is transmitted en bloc, wherein a second preamble of the at least two preambles is transmitted en bloc, wherein the data comprises at least two data packets, the data transmitter being configured to send out the at least two data packets in accordance with the frequency hopping pattern and/or time hopping pattern, wherein the data is a telegram, the data transmitter being configured to split up the telegram into the at least two data packets, each of the at least two data packets being shorter than the telegram, wherein the first preamble is longer than each of the at least two data packets, wherein the second preamble is longer than each of the at least two data packets;

and a data receiver configured to receive the data, or extract it from a buffer, while using the frequency hopping pattern and/or time hopping pattern in a manner that is time-synchronized with the reference signal, wherein the data receiver is configured to receive the at least two data packets, or to extract them from the buffer, in accordance with the frequency hopping pattern and/or time hopping pattern, and wherein the data receiver is configured to combine the at least two data packets in order to obtain the telegram.

13. Method of transmitting data, comprising:
sending out data in a manner that is time-synchronized with a reference signal while using a frequency hopping pattern and/or time hopping pattern, sending out the reference signal temporally before the data, such that transmission of the reference signal is not superimposed by transmission of the data, wherein the reference signal includes at least two preambles the, wherein the at least two preambles are transmitted on different frequencies, wherein a first preamble of the at least two preambles is transmitted en bloc, wherein a second preamble of the at least two preambles is transmitted en bloc, wherein the data comprises at least two data packets, wherein the at least two data packets are sent out in accordance with the frequency hopping pattern and/or time hopping pattern, wherein the data is a telegram, wherein the telegram is split up into the at least two data packets, each of the at least two data packets being shorter than the telegram, wherein the first preamble is longer than each of the at least two data packets, and wherein the second preamble is longer than each of the at least two data packets.

14. Method of receiving data, comprising:
receiving data while using a frequency hopping pattern and/or time hopping pattern in a manner that is time-synchronized with a reference signal;

wherein the reference signal is transmitted temporally before the data, such that transmission of the reference signal is not superimposed by transmission of the data, wherein the reference signal includes at least two preambles, wherein the at least two preambles are transmitted on different frequencies, wherein a first preamble of the at least two preambles is transmitted en bloc, wherein a second preamble of the at least two preambles is transmitted en bloc, wherein the data includes at least two data packets, wherein the at least two data packets are received or to extracted from the buffer in accordance with the frequency hopping pattern and/or time hopping pattern, wherein the data is a telegram that is split up into the at least two data packets, each of the at least two data packets being shorter than the telegram, wherein the at least two data packets are combined in order to obtain the telegram, wherein the first preamble is longer than each of the at least two data packets, and wherein the second preamble is longer than each of the at least two data packets.

15. A non-transitory digital storage medium having a computer program stored thereon, when executed by a computer, to perform a transmitting method comprising:
    sending out data in a manner that is time-synchronized with a reference signal while using a frequency hopping pattern and/or time hopping pattern,
    sending out the reference signal temporally before the data, such that transmission of the reference signal is not superimposed by transmission of the data,
    wherein the reference signal includes at least two preambles,
    wherein the at least two preambles are transmitted on different frequencies,
    wherein a first preamble of the at least two preambles is transmitted en bloc,
    wherein a second preamble of the at least two preambles is transmitted en bloc,
    wherein the data comprises at least two data packets, wherein the at least two data packets are sent out in accordance with the frequency hopping pattern and/or time hopping pattern,
    wherein the data is a telegram, wherein the telegram is split up into the at least two data packets, each of the at least two data packets being shorter than the telegram,
    wherein the first preamble is longer than each of the at least two data packets, and
    wherein the second preamble is longer than each of the at least two data packets.

16. A non-transitory digital storage medium having a computer program stored thereon, when executed by a computer, to perform a receiving method comprising:
    receiving data while using a frequency hopping pattern and/or time hopping pattern in a manner that is time-synchronized with a reference signal;
    wherein the reference signal is transmitted temporally before the data, such that transmission of the reference signal is not superimposed by transmission of the data,
    wherein the reference signal includes at least two preambles,
    wherein the at least two preambles are transmitted on different frequencies,
    wherein a first preamble of the at least two preambles is transmitted en bloc,
    wherein a second preamble of the at least two preambles is transmitted en bloc,
    wherein the data includes at least two data packets, wherein the at least two data packets are received or to extracted from the buffer in accordance with the frequency hopping pattern and/or time hopping pattern,
    wherein the data is a telegram that is split up into the at least two data packets, each of the at least two data packets being shorter than the telegram,
    wherein the at least two data packets are combined in order to obtain the telegram,
    wherein the first preamble is longer than each of the at least two data packets, and
    wherein the second preamble is longer than each of the at least two data packets.

\* \* \* \* \*